Dec. 11, 1934.   O. THIEME   1,984,047
BEVERAGE MAKER AND METHOD
Filed June 10, 1933   3 Sheets-Sheet 1
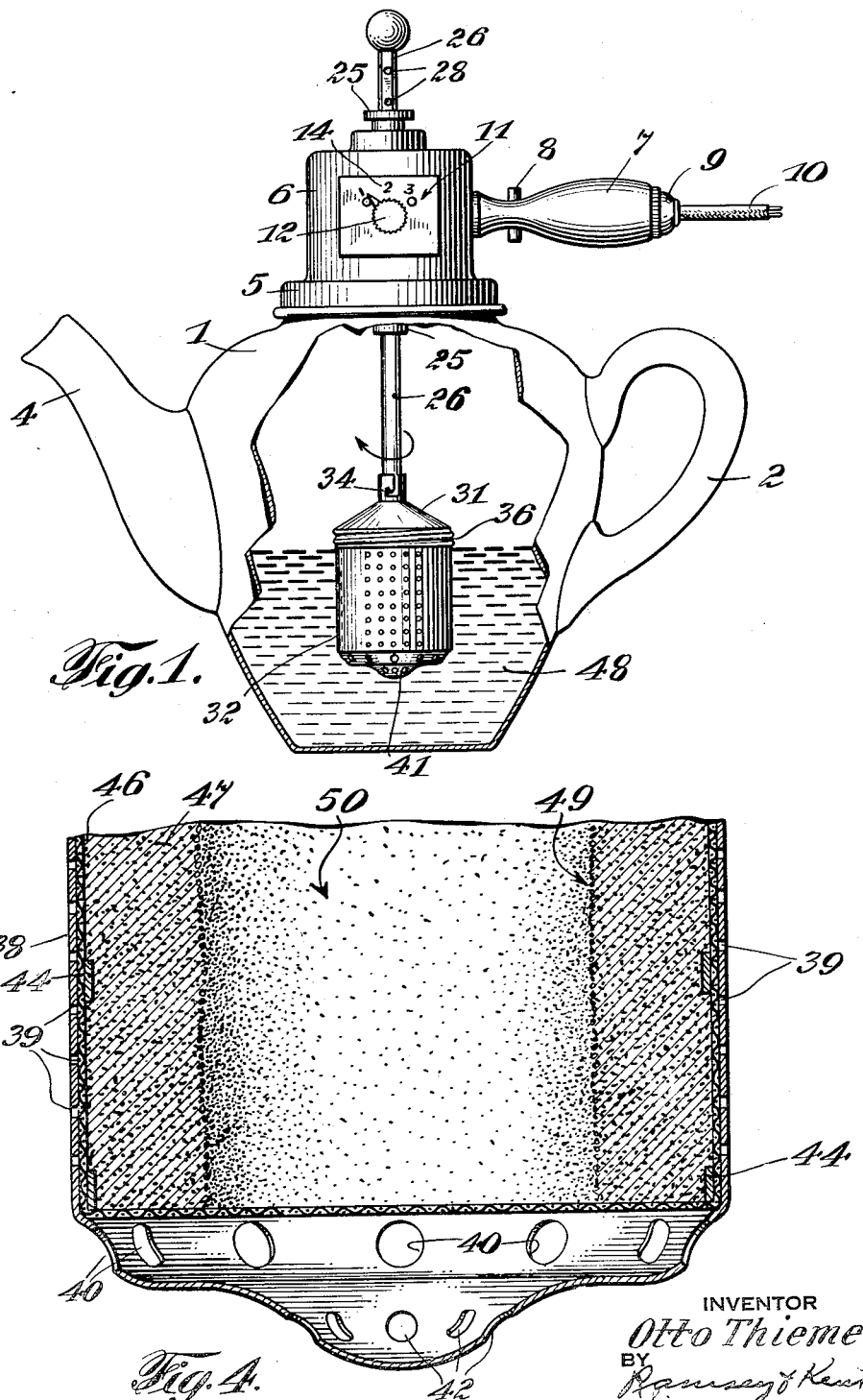
INVENTOR
Otto Thieme
BY
Ramsey & Kent
his ATTORNEYS

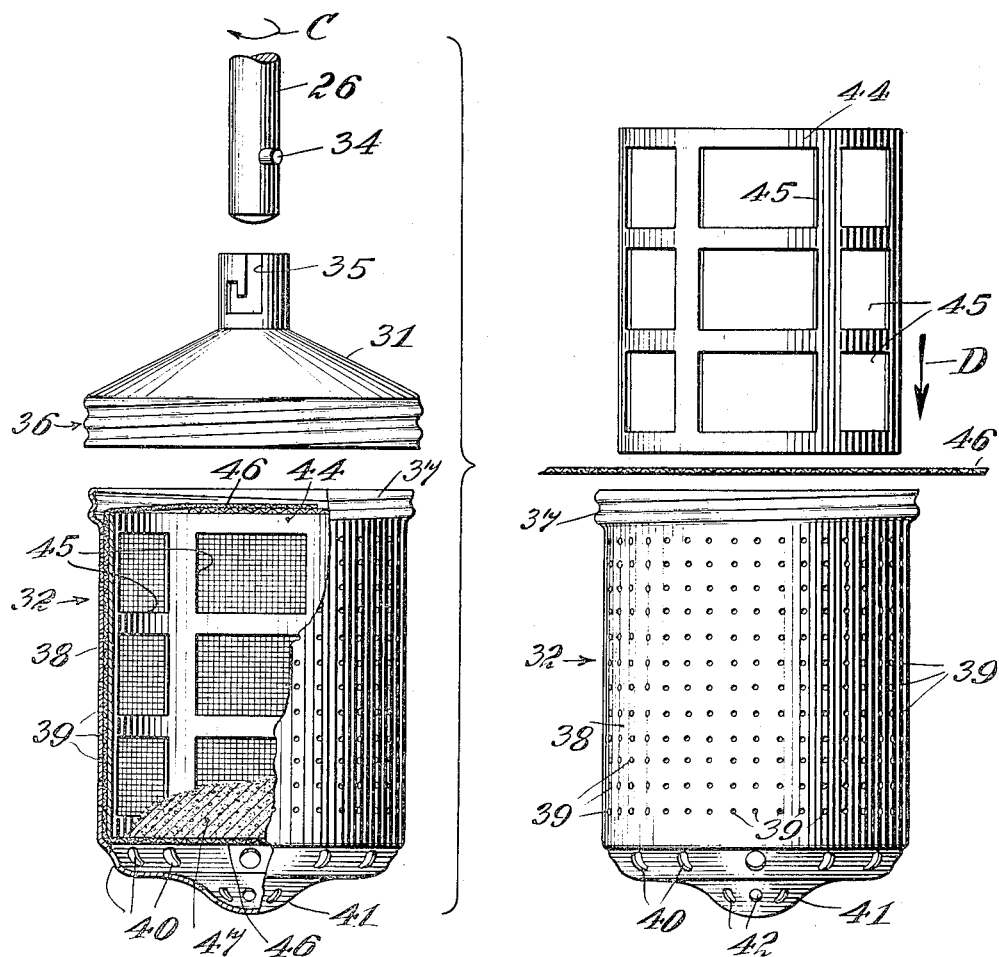

Dec. 11, 1934.   O. THIEME   1,984,047
BEVERAGE MAKER AND METHOD
Filed June 10, 1933   3 Sheets-Sheet 3

INVENTOR
Otto Thieme
BY
Ramsey & Kent
his ATTORNEYS

Patented Dec. 11, 1934

1,984,047

UNITED STATES PATENT OFFICE 1,984,047

BEVERAGE MAKER AND METHOD

Otto Thieme, West Hartford, Conn.

Application June 10, 1933, Serial No. 675,164

12 Claims. (Cl. 53—3)

The present invention is a device for making beverages such as coffee or tea wherein the flavor of the beverage is obtained from the beverage base when treated with a liquid, such as the making of tea or coffee from coffee grounds or tea leaves and boiling water.

The present invention comprises a simple apparatus by means of which water may be circulated repeatedly and rapidly through the beverage making base.

The present invention will be described in connection with the making of coffee. The apparatus is preferably an electrically driven vertical spindle which carries a perforated rotatable coffee holding spinner provided with a coffee supporting space and a liquid space at the bottom of the spinner. This perforated spinner is intended to carry a filtering medium which may comprise a section of cheese cloth bag or the like into which a desired amount of coffee grounds is introduced. These coffee grounds are considerably less than the total volume of the spinner. Preferably, the spinner is provided with an inside stretching frame over which the filter cloth bag is stretched as it is inserted in the container. A motor, preferably an electrical motor of two or three thousand revolutions per minute, is provided to drive the vertical spindle and is mounted upon a suitable cover of a container for liquid. The coffee spinner may be detachably secured to this vertical spindle. Preferably, the vertical spindle is vertically adjustable so that the spinner may be raised and lowered relative to the container holding the hot water so that the entire spinner is not submerged.

The current for the electric motor preferably passes through a timing device which is so constructed as to terminate the operation of the apparatus after a predetermined period of activity, for example, one, two or three minutes depending upon the strength of coffee desired. The timing device which controls the operation of the motor operates an intermittent actuator so that the spindle has alternating periods of activity and rest, for example, during the time when the apparatus is operating, for example, suppose it to be set for a two minute period, the timing mechanism operates a make and break mechanism for the current so that the motor will rotate for two seconds and will then rest for four seconds. These alternate periods of rest and activity continue in succession for two minutes, at which time the motor is definitely stopped. The spinner then is removed from the hot water container and the coffee is made. In the operation of the device, during the first period of rotation of the spinner, the coffee grounds are thrown outwardly in the form of a hollow cylinder where they are supported by the filter cloth. The water which has been infiltrated with the coffee grounds is thrown outwardly through the grounds, the filter cloth, and the perforations in the spinner. As soon as the spinner stops rotating, water immediately flows into the spinner and since the bottom of the spinner and the bottom of the filter cloth bag is the freest path for entry of water, the center of the spinner quickly fills with water from the container. The hot water during the rest period stands in contact with the coffee grounds and soaks up the coffee essence from the grounds. When the spinner operates, this concentrated fluid is thrown out through the side wall of the spinner and a circulation of a relatively small amount of water is maintained through the spinner since the center of the bottom of the spinner, which is relatively neutral during the spinning operation, will permit the hot water to come into the spinner through the openings in the center of the bottom and be thrown out through the side wall of coffee. During the succeeding periods of rest, the water lies acquiescent in the coffee grounds and becomes further saturated with the coffee essence and then when the spinning again starts, this saturated essence is washed out and carries the coffee flavor into the surrounding water in which the apparatus is immersed.

Preferably, in the use of the device, the spinner is not completely immersed in the water for two reasons, one being that a complete immersion adds a substantial drag to the spinner without any substantial benefit, and the other being that a partial immersion of the spinner permits the water to be drawn into the bottom of the spinner and thrown out from the upper portion of the spinner above the surface of the liquid so that the entire interior of the hot water container is sprayed with liquid when the device is in operation.

From the foregoing, it will be observed that the present invention also comprises a method whereby a beverage of coffee is made by placing coffee making material in a container which is partly submerged in an enclosed body of hot water. Then the container is intermittently rotated at high speeds. Preferably, the rotation is continued for a predetermined length of time and then the container is removed from the solution and the beverage is ready for use.

Other and further objects of the present invention will in part be obvious and will in part be pointed out hereinafter by reference to the accompanying drawings.

It is realized that the present invention may be practiced in constructions other than those specifically disclosed herewith, and, therefore, the present disclosure is to be understood as illustrative and not in the limiting sense.

Fig. 1 is an elevational view of the preferred form of the invention.

Fig. 2 is a view showing the spinner, the top and the lower end of the spindle, with a part of the spinner in section.

Fig. 3 shows the spinner, the cloth supporting sleeve, and the filter cloth ready to be assembled.

Fig. 4 is an enlarged sectional view showing the position of the ground coffee after the spinner has been rotated.

Figure 5:
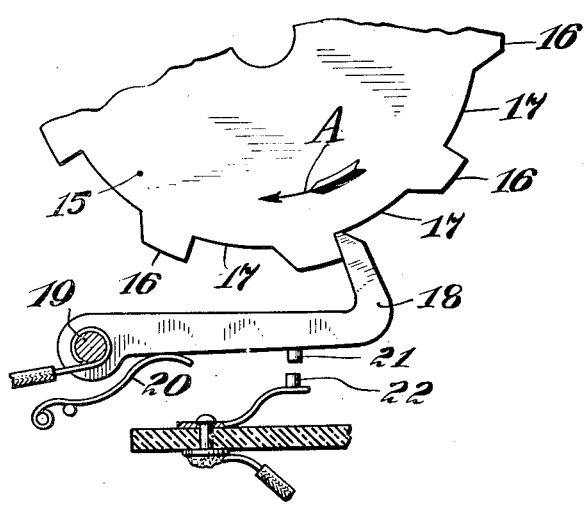
Fig. 5 is a detail view of the intermittent make and break member of the timer.

Referring now to the drawings and more especially to Fig. 1, the device compr      a container 1 for liquid such as hot wate  and may be provided with a handle 2 and a spout 4, for pouring liquid from the container. A cover 5 is adapted to fit the mouth of the container 1 and a suitable electric motor is mounted in an extension 6 on the cover. The operating current for said motor passes through a motor handle 7 which may be equipped with a starting switch 8. Preferably, a connector 9 forms the end of the handle 7 and provides the usual friction prong connection with the electrical conduit 10. The mounting of this friction prong connection on the end of the motor handle provides a convenient arrangement whereby the conduit 10 may be quickly attached and detached from the apparatus so that it may be freely handled without the inconvenience of attached electric wires.

The electrical circuit from the starting switch passes through a timer 11. This timer preferably is of a well known type and therefore need not be illustrated and described in detail. The timer is constructed to make a final interruption of the current at the end of one, two, or three minute periods, depending on where the control arm 12 is set relatively to the scale 14 and must be reset at the beginning of each new operation. The timer utilized is a type well known in the art with one single exception, that is, the timer operates an intermittent make and break for the motor current which may comprise a cam wheel 15 (Fig. 5) that is provided with teeth 16 and dwells 17. The contact arm 18 is pivoted in the timer casing as at 19 and is urged against the face of the cam wheel 15 by a spring 20. As the cam wheel 15 rotates in the direction of the arrow A, the contact arm is oscillated on its pivot 19. The oscillation of the contact arm makes and breaks the electrical contact between the contact members 21 and 22. The dwells 17 are of such length relative to the rotation of the cam wheel 15 that the contact arm 18 remains in the dwells 17 for substantially four second intervals. The inclined surface 24 connects the dwells 17 with the top of the teeth 16 and is such that a fraction of a second occurs between the time when the contact arm leaves the dwell and moves sufficiently to connect the contact members 21 and 22. Then, the contact arm rides upon the top of the teeth 16 for substantially two seconds with the contact members 21 and 22 in engagement, at the end of which time the contact arm quickly drops from the top of the teeth, thereby breaking the engagement between the contact members 21 and 22. When the contact members 21 and 22 are in engagement, the electrical circuit from the electrical conduit 10 is operative to drive the electric motor, assuming, of course, that the starting switch 8 has been set to close the circuit. Therefore, while the contact arm is riding the teeth 16, the motor is rotating at between two and three thousand revolutions per minute for a period of two seconds. When the contact arm drops from the top of the teeth 16, the circuit is opened and the motor is no longer energized, consequently, it stops and remains stationary for substantially four seconds when the operation is repeated. The speed of the motor is, of course, dependent upon the character of the motor and the character of the current used. Preferably, the speed chosen should be between two thousand and thirty-six hundred revolutions per minute. These limits are nearly arbitrary but for a small sized coffee maker intended to make a few cups of coffee, these speeds have proven satisfactory.

The shaft for the motor in large sized devices may comprise a hollow member 25 through which a supporting spindle 26 is adjustable vertically. This supporting spindle preferably is flatted at 27 on one side and is provided with recesses 28 at suitable intervals. The hollow motor shaft 25 fits the spindle 26 so that there is a positive drive between the parts.

Figure 6:
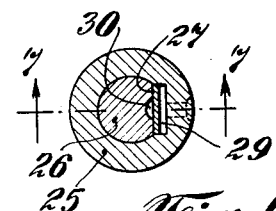
Fig. 6 is a sectional view of the motor shaft and spindle on line 6—6 of Fig. 7.
Figure 7:
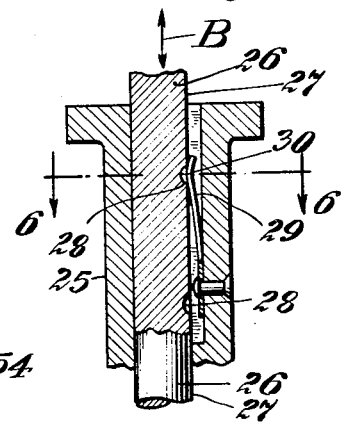
Fig. 7 is a sectional view of the motor shaft and spindle on line 7—7 of Fig. 6.

As illustrated in Figs. 6 and 7, in this form the motor shaft 25 is provided with a flat spring 29 carrying a small projection 30 adapted to cooperate with the recesses 28 in the spindle 26 so that the spindle 26 may be raised or lowered vertically as illustrated by the arrow B (Fig. 7) and will be held in adjusted position by the projection 30 being urged into a recess 28 in the spindle 26.

The lower end of the supporting spindle 26 carries the top 31 of a spinner 32. This top 31 may be permanently secured to the supporting spindle 26, but preferably is detachably mounted on the spindle 26 by means of a pin 34 and bayonet slot 35 connection, which is so constructed that when the spindle 26 rotates in the direction of the arrow C, the pin 34 is seated in the locking portion of the bayonet slot 35. Preferably, the skirt of the top 31 is screw threaded. This top and skirt may comprise a thin piece of sheet metal pressed or drawn into shape with the screw threads 36 formed therein.

The spinner 32 preferably is provided with an enlarged band at its upper edge which is screw threaded as at 37 in order to cooperate with the screw threads 36 on the top 31 to securely lock the spinner to the top. It will be observed that the direction of the screw threads 36—37 is such that when the supporting shaft 26 rotates in the direction of the arrow C, the tendency of the friction of the water on the spinner is to screw thread the parts together. The side wall 38 of the spinner 32 is preferably cylindrical in shape and is provided with a large number of small openings 39. The bottom of the spinner preferably is in the form of an inverted dome and is provided with large openings 40. The central part of the dome is provided with a semi-spherical cup 41, which is also provided with openings 42.

Figure 8:
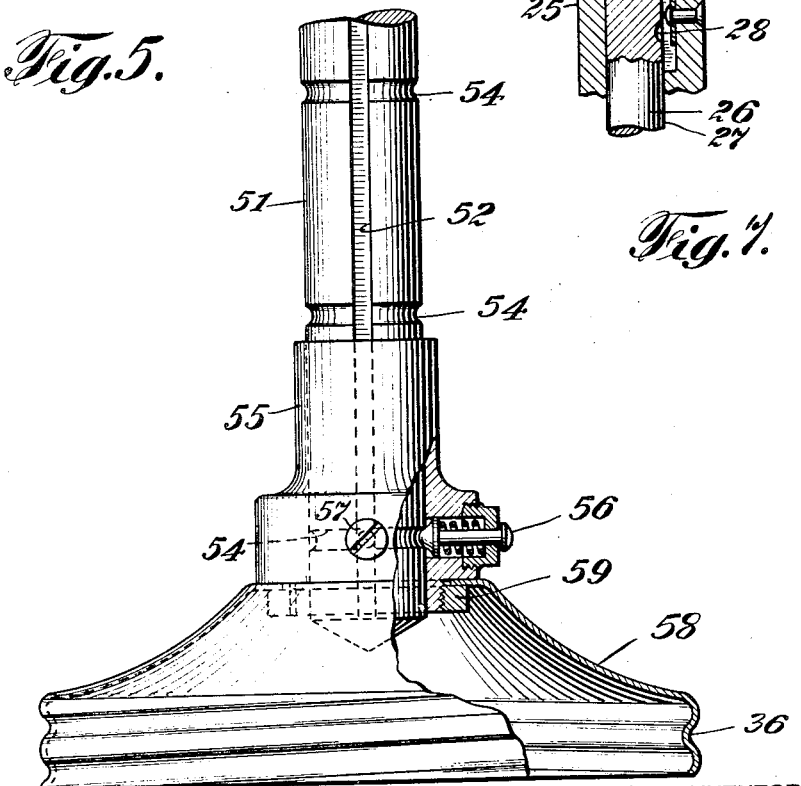
Fig. 8 is a modification of the spindle construction.

A supporting sleeve 44 is adapted to be telescoped within the side wall 38 of the spinner 32 and this supporting sleeve is provided with large window openings 45. A filter cloth member 46 (Figs. 2, 3, and 4) is adapted to be placed over the mouth of the spinner 32 so that it will be stretched over the supporting sleeve 44 when this sleeve is telescoped into the spinner as is illustrated by the arrow D in Fig. 3. The ground coffee 47, or other suitable material, is placed on the bottom of the filter cloth 46 which is stretched over the bottom of the sleeve 44 like the head of a drum and then the upper edge of the filter cloth is folded inwardly upon itself as indicated in Fig. 2. The spinner 32 is now screw threaded to the top 31 which is placed upon the lower end of the supporting shaft 26. Hot water 48 (Fig. 1) for the required number of cups of coffee is poured into the container 1 and the cover 5 replaced on the container 1. The supporting spindle 26 is adjusted vertically so that the spinner 32 is just immersed into hot water 48. The timer control arm 12 is set relative to the desired point on the scale 14 and the switch 8 is operated to start the motor. The ground coffee 47 assumes a hollow cylindrical position 49 (Fig. 4) as soon as the shaft 26 rotates, and hot water, which has been soaking into the coffee, is thrown outwardly through the small openings 39 in the side wall 38 of the spinner. A relatively small volume of water enters the spinner while rotating through the openings 40 and 42. This water is likewise thrown outwardly through the openings 39. When the spinner intermittently stops, the ground coffee tends to maintain its hollow cylindrical position 49 while the hollow core 50 quickly fills up with hot water through the openings 40 and 42, and again the hot water soaks up the essence of the coffee, to be thrown out as soon as the motor starts. This operation is continued until the motor is permanently stopped by the time switch. Where desired, the time switch may operate a signal which shows a definite desired period of time has elapsed.

Where the device is of small capacity, the motor sleeve shaft construction is not well adapted to fit into a small motor armature, therefore in small sized units the preferred form is a solid non-slidable shaft 51 (Fig. 8) provided with a key-way 52 and annular grooves 54. The spinner top is provided with a hub 55 vertically slidable on the shaft 51. This hub 55 carries a spring pressed plunger 56 adapted to cooperate with the annular grooves 54 to retain the hub 55 in adjusted positions on the shaft 51. The hub 55 also carries a stub screw 57 the end of which slides in the key-way 52 so that while the hub 55 may be adjusted longitudinally on the shaft 51 it can not be rotated thereon. The hub 55 carries a top 58 of the spinner which may be held in place with a ring nut 59. This top 58 is screw threaded with threads 36 like the top 31. In this form of device the spinner is raised and lowered by telescoping the end of the shaft 51 into the hollow core 50 of the spinner.

However, the strength of the coffee is determined very largely by two things, namely, the period of rest during which the hot water is in contact with the coffee to soak up the essence, and the period of rotation during which the hot water is circulated through the coffee. Experience has shown that both periods are required to obtain desired results, so, therefore, no serious disadvantage occurs if the spinner is retained in the hot water a short time after the motor has stopped rotating. Consequently, the use of a signal device operated by the time switch is merely an arbitrary feature which may or may not be included.

Use of the present invention has shown that the apparatus will produce coffee of predetermined varying degrees of strength within the time of from one to three minutes by the mere utilization of hot water without necessity of boiling the water during the coffee making operations.

Having described my invention, I claim:

1. A device of the class described comprising a vessel for containing a liquid, a cover for the vessel, an electric motor supported thereby, a shaft depending from said motor, a foraminous beverage container provided with a screw threaded top, means for adjustably securing said top to said shaft, and control means for the motor for intermittently making and breaking the circuit of the motor.

2. A device of the class described comprising a vessel for containing a liquid, a cover for the vessel, an electric motor supported thereby, a shaft depending from said motor, a foraminous beverage container provided with a screw threaded top, means for adjustably securing said top to said shaft, and control means carried by the cover for intermittently making and breaking the circuit of the motor.

3. A device of the class described comprising a vessel for containing various amounts of liquid, a cover therefor, an electric motor supported by said cover, a shaft depending therefrom, a foraminous beverage container, means for adjusting said container relative to said cover in accordance with the amount of liquid in the vessel, and means for intermittently operating the motor at high speed.

4. A device of the class described, comprising a liquid containing vessel, a cover therefor, an electric motor supported by said cover, a shaft operated by the motor, a foraminous beverage container attached to said shaft adapted to be rotated in the liquid, and motor control means for permitting the motor to operate intermittently at a high rate of speed and to stop said motor after a predetermined time.

5. In a device of the class described, an electric motor; a shaft operated thereby; a foraminous container for beverage making material, comprising an outer cylindrical receptacle having a perforated side wall, a perforated inner material receptacle of the same length as the outer receptacle, filtering material between the inner and outer receptacles; a top for the outer receptacle; means for adjustably attaching the container to the shaft; and means for controlling the motor to rotate the container intermittently at high speed to cause the material in the inner receptacle to be thrown against the walls thereof by centrifugal force.

6. A device of the class described comprising a vessel to contain liquid, a perforated container for beverage material, a liner therein of substantially the same height as the container, a top for the container, a cover for the vessel, a motor supported thereon, a shaft operated by the motor, the container being carried by said shaft, and means to intermittently control said motor.

7. In a device of the class described comprising a vessel to contain liquid, a cover, an electric motor, a shaft operated thereby, a perforated beverage material container carried by said shaft, means to change the effective length of the shaft to adjust the position of the container in the vessel, and settable control means for causing the motor to operate the shaft at successive periods of rotation and rest for a predetermined time and to stop the motor at the end of said time.

8. A coffee pot provided with a handle and spout, a cover therefor, a motor carried by said cover, a shaft depending from said motor, a perforated coffee holder adjustably and removably attached to said shaft, control means adjacent the motor for causing the motor to rotate the coffee holder intermittently for a predetermined period of time in the liquid in the pot.

9. In combination with a vessel designed to contain varying amounts of liquid, a cover therefor, a shaft extending through said cover, a foraminous receptacle adapted to contain corresponding varying amounts of beverage material, said receptacle being removably and adjustably attached to said shaft, a motor for rotating said shaft, and means for controlling said motor to cause it to run intermittently.

10. The process of brewing coffee comprising rotating intermittently at high speed for a predetermined period of time coffee making material in a perforated coffee container in an inclosed body of water heated slightly below the boiling point.

11. The process of brewing coffee comprising rotating intermittently at high speed for a predetermined period of time, coffee making material in a perforated coffee container partly submerged in an inclosed body of heated water, and removing said container at the expiration of the time limit.

12. The process of brewing a beverage comprising rotating intermittently for a predetermined time a perforated container enclosing beverage making material partly submerged in an inclosed body of heated water, and removing said container at the expiration of the time limit.

OTTO THIEME.